(12) United States Patent
Sugimoto et al.

(10) Patent No.: US 9,702,062 B2
(45) Date of Patent: Jul. 11, 2017

(54) PROCESS FOR PRODUCING PURIFIED POLYSACCHARIDE FIBERS, PURIFIED POLYSACCHARIDE FIBERS AND TIRES

(71) Applicant: BRIDGESTONE CORPORATION, Tokyo (JP)

(72) Inventors: Kenichi Sugimoto, Tokyo (JP); Mitsuharu Koide, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/892,246

(22) PCT Filed: May 21, 2014

(86) PCT No.: PCT/JP2014/063472
§ 371 (c)(1),
(2) Date: Nov. 19, 2015

(87) PCT Pub. No.: WO2014/189080
PCT Pub. Date: Nov. 27, 2014

(65) Prior Publication Data
US 2016/0168757 A1 Jun. 16, 2016

(30) Foreign Application Priority Data

May 21, 2013 (JP) .................... 2013-107372

(51) Int. Cl.
*D01F 2/02* (2006.01)
*B29C 47/00* (2006.01)
(Continued)

(52) U.S. Cl.
CPC ............ *D01F 2/02* (2013.01); *B29C 47/0014* (2013.01); *B60C 9/0042* (2013.04); *C08L 1/02* (2013.01);
(Continued)

(58) Field of Classification Search
None
See application file for complete search history.

(56) References Cited

U.S. PATENT DOCUMENTS 1,943,176 A 1/1934 Graenacher
2,036,606 A 4/1936 Richter et al.
(Continued)

FOREIGN PATENT DOCUMENTS

CN 1851063 A 10/2006
CN 101328626 A 12/2008
(Continued)

OTHER PUBLICATIONS

International Search Report of PCT/JP2014/063472 dated Aug. 19, 2014.
(Continued)

*Primary Examiner* — Vu A Nguyen
(74) *Attorney, Agent, or Firm* — Sughrue Mion, PLLC

(57) ABSTRACT

A process for producing purified polysaccharide fiber of the present invention includes bringing a polysaccharide solution, which is obtained by dissolving a polysaccharide raw material in a liquid containing an ionic liquid, into contact with a solidification liquid containing an ionic liquid, and performing dry-wet spinning on polysaccharide, in which the concentration of the ionic liquid in the solidification liquid is 0.4% by weight to 70% by weight, and a distance D from a site where the polysaccharide solution is extruded in the form of fiber to a site where the extruded polysaccharide solution comes into contact with the solidification liquid is 50 mm to 120 mm.

8 Claims, 1 Drawing Sheet

(51) Int. Cl.

| | | |
|---|---|---|
| *D01D 5/04* | (2006.01) | |
| *D01D 5/06* | (2006.01) | |
| *D01F 9/00* | (2006.01) | |
| *B60C 9/00* | (2006.01) | |
| *C08L 1/02* | (2006.01) | |
| *C08L 21/00* | (2006.01) | |
| *B29C 47/88* | (2006.01) | |
| *B29L 31/00* | (2006.01) | |

(52) U.S. Cl.
CPC ............... *C08L 21/00* (2013.01); *D01D 5/04* (2013.01); *D01D 5/06* (2013.01); *D01F 9/00* (2013.01); *B29C 47/8895* (2013.01); *B29K 2005/00* (2013.01); *B29L 2031/731* (2013.01); *C08L 2205/16* (2013.01)

(56) References Cited

U.S. PATENT DOCUMENTS

| | | | |
|---|---|---|---|
| 2,878,118 | A | 3/1959 | Rogers et al. |
| 2006/0099419 | A1 | 5/2006 | Kwon et al. |
| 2008/0269477 | A1 | 10/2008 | Stegmann et al. |
| 2010/0256352 | A1 | 10/2010 | Uerdingen et al. |
| 2012/0253030 | A1* | 10/2012 | Kapoor ............... C08B 1/003 536/56 |
| 2013/0248077 | A1* | 9/2013 | Sugimoto ............. B60C 9/0042 152/564 |
| 2015/0148458 | A1* | 5/2015 | Koide ..................... D02G 3/48 524/35 |

FOREIGN PATENT DOCUMENTS

| | | |
|---|---|---|
| CN | 101346416 A | 1/2009 |
| CN | 101608347 A | 12/2009 |
| CN | 101748499 A | 6/2010 |
| CN | 102154720 A | 8/2011 |
| CN | 103046146 A | 4/2013 |
| CN | 104471121 A | 3/2015 |
| EP | 1 980 653 A2 | 10/2008 |
| GB | 2451046 A | 1/2009 |
| JP | 99233 C | 1/1933 |
| JP | 35-6660 B | 6/1960 |
| JP | 35-8561 B | 7/1960 |
| JP | 60-144322 A | 7/1985 |
| JP | 2005-023508 A | 1/2005 |
| JP | 2006-188806 A | 7/2006 |
| JP | 2008-248466 A | 10/2008 |
| JP | 4242768 B2 | 3/2009 |
| JP | 4478392 B2 | 6/2010 |
| JP | 2011-505435 A | 2/2011 |
| JP | 2012-132137 A | 7/2012 |
| JP | 2013-507534 A | 3/2013 |
| KR | 10-0575378 B1 | 5/2006 |
| WO | 98/22642 A1 | 5/1998 |
| WO | 2007128268 A2 | 11/2007 |
| WO | 2011/048608 A2 | 4/2011 |
| WO | 2011/048609 A2 | 4/2011 |
| WO | 2011048420 A1 | 4/2011 |
| WO | 2012/156441 A1 | 11/2012 |
| WO | 2013/176138 A1 | 11/2013 |

OTHER PUBLICATIONS

Qin, et al, "Dissolution or extraction of crustacean shells using ionic liquids to obtain high molecular weight purified chitin and direct production of chitin films and fibers", Green Chemistry, 2010, vol. 12, pp. 968-971 (4 pages).

Communication dated Oct. 20, 2015, from the Japanese Patent Office in Japanese application No. 2012-116087.

Communication dated Oct. 20, 2015 from the Japanese Patent Office in Japanese application No. 2012-116086.

Communication dated Oct. 12, 2015 from the State Intellectual Property Office of the P.R.C. in Chinese application No. 201380038464.5.

Communication dated Aug. 13, 2013, from the Japanese Patent Office in Japanese application No. PCT/JP2013/064104.

International Search Report PCT/JP2013/064104 dated Aug. 13, 2013.

Non-Final Office Action issued in U.S. Appl. No. 14/402,154 dated Nov. 20, 2015.

Non-Final Office Action issued in U.S. Appl. No. 14/402,154 dated Jun. 3, 2016.

Communication dated May 23, 2017, issued by the Japan Patent Office in corresponding Japanese Application No. 2013-107372.

* cited by examiner

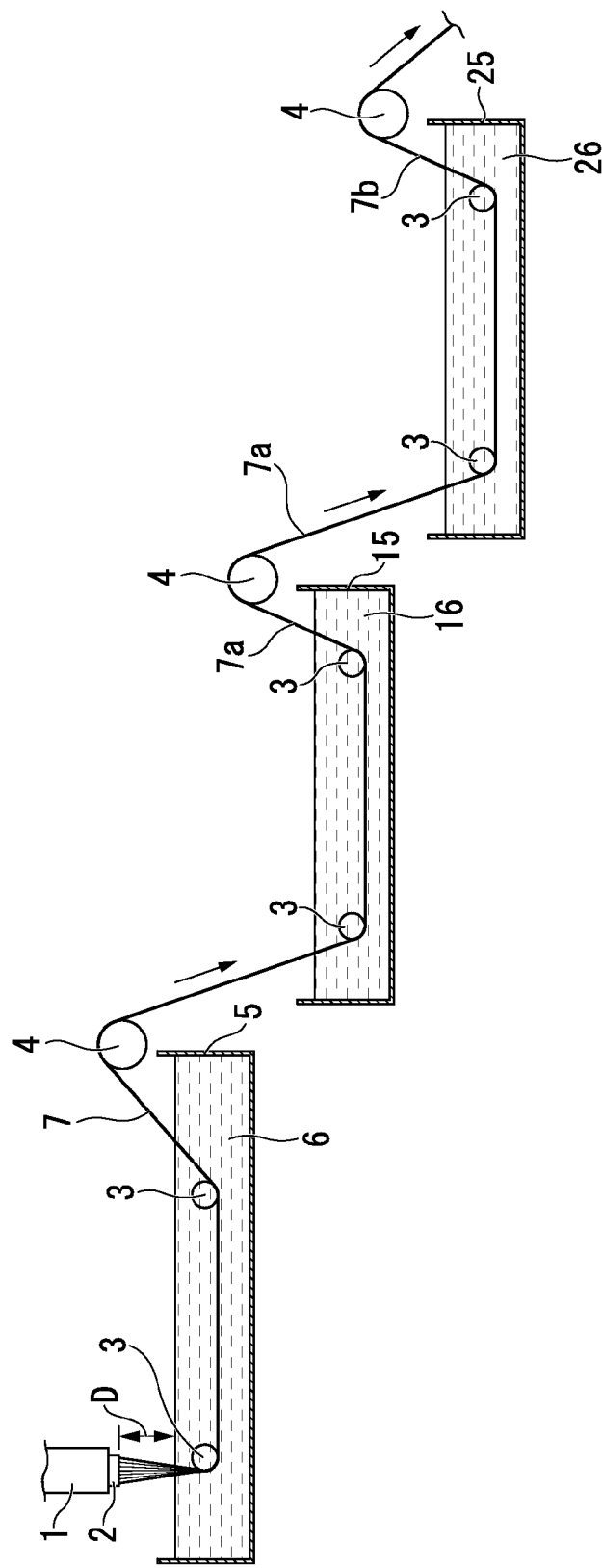

PROCESS FOR PRODUCING PURIFIED POLYSACCHARIDE FIBERS, PURIFIED POLYSACCHARIDE FIBERS AND TIRES

TECHNICAL FIELD

The present invention relates to a process for producing purified polysaccharide fibers, purified polysaccharide fibers, and tires.

This is a National Stage of International Application No. PCT/JP2014/063472 filed May 21, 2014, claiming priority based on Japanese Patent Application No. 2013-107372 filed May 21, 2013, the contents of all of which are incorporated herein by reference in their entirety.

BACKGROUND ART

Purified cellulose fiber has advantages such as excellent dimensional stability, high adhesiveness, and an elastic modulus that exhibits low temperature dependence (change of an elastic modulus according to the variation of temperature). The purified cellulose fiber is easily produced by passing a dissolved cellulose raw material through water, an alcohol, or an aqueous solution of water and an ionic liquid. The spinning of cellulose by using such an ionic liquid is reported in Patent Documents 1 and 2. It can be said that the process for producing purified cellulose fiber obtained by using the ionic liquid is a method that imposes a light load on the environment.

Generally, in a tire, the purified cellulose fiber is twisted, made into cords, and subjected to an adhesion treatment. Thereafter, the fiber is covered with rubber, and used in the form of a fiber-rubber complex. In a tire, fiber is used mainly for the purpose of reinforcing rubber. Accordingly, it is preferable for the fiber to have high toughness. The higher the toughness of the fiber, the more the amount of the fiber used in the tire can be reduced. As a result, the weight of the tire and the rolling resistance can be reduced.

Furthermore, if the amount of the fiber used can be reduced, the amount of materials and energy required for producing the tire can be reduced.

CITATION LIST

Patent Literature

[Patent Document 1] Chinese Patent No. 101328626
[Patent Document 2] PCT International Publication No. WO2011/048608

SUMMARY OF INVENTION

Technical Problem

When being subjected to wet spinning or dry-wet spinning, polysaccharide is solidified from the outside of the fiber (filament). Consequently, when the fiber is observed in the cross-sectional direction thereof, the structure of the inside of the fiber tends to easily vary from the structure of the outside of the fiber (so-called skin-core structure is easily formed). The fiber with the skin-core structure has low toughness, and a tire using such fiber exhibits poor tire characteristics.

In a process for producing purified polysaccharide fiber in which a polysaccharide solution is brought into contact with a solidification liquid containing an ionic liquid, and the polysaccharide is subjected to wet spinning or dry-wet spinning, the ionic liquid is recycled by being recovered from the solidification liquid held in a solidification bath and reused for spinning. Because the recycle efficiency exerts a great influence on the productivity of fiber, it is preferable that the recycle efficiency to be as high as possible. The inventor of the present invention found that the concentration of the ionic liquid in the solidification liquid is closely related to the recycle efficiency. According to the invention described in Patent Document 1, by adjusting the concentration of the ionic liquid, excellent physical properties (high toughness·a high elongation rate) of fiber can be achieved. However, in the invention, the recycle efficiency of the expensive ionic liquid described above is not considered. Therefore, the invention has problems in regard to the physical properties of fiber and the production cost.

According to the invention described in Patent Document 2, by specifying the concentration of the ionic liquid and by setting a distance (Air-gap distance) from a site where a polysaccharide solution is extruded in the form of fiber to a site where the extruded polysaccharide solution comes into contact with a solidification liquid to be 0 mm to 50 mm, excellent physical properties of fiber can be achieved. However, in the invention, the compatibility between the recycle efficiency and the physical properties of fiber is not considered. Therefore, the invention has problems in regard to the physical properties of fiber and the production cost.

The inventor of the present invention also found that the concentration of the ionic liquid in the solidification liquid is closely related to the moldability of fiber.

The present invention has been made under the circumstances described above, and an object thereof is to provide a process for producing purified polysaccharide fiber which is excellent in the recycle efficiency of an ionic liquid and has high toughness and a high degree of elongation at break, purified polysaccharide fiber which is produced by using the production process, and a tire which uses the purified polysaccharide fiber.

Solution to Problem

The present invention provides a process for producing purified polysaccharide fiber, purified polysaccharide fiber, and a tire which have the following characteristics.

(1) A process for producing purified polysaccharide fiber, including bringing a polysaccharide solution, which is obtained by dissolving a polysaccharide raw material in a liquid containing an ionic liquid, into contact with a solidification liquid containing an ionic liquid and performing dry-wet spinning on polysaccharide, in which the concentration of the ionic liquid in the solidification liquid is 0.4% by weight to 70% by weight, and a distance D from a site where the polysaccharide solution is extruded in the form of fiber to a site where the extruded polysaccharide solution comes into contact with the solidification liquid is 50 mm to 120 mm.

(2) The process for producing purified polysaccharide fiber described in (1), in which the concentration of the ionic liquid in the solidification liquid is 20% by weight to 40% by weight.

(3) The process for producing purified polysaccharide fiber described in (1) or (2), in which each of the ionic liquid in the polysaccharide solution and the ionic liquid in the solidification liquid is composed of a cationic portion and an anionic portion, and the anionic portion contains one or more kinds of ions selected from the group consisting of a phosphinate ion represented by the following Formula (C2), a phosphonate ion, and a phosphate ion.

[In the formula, each of $X^1$ and $X^2$ independently represents a hydrogen atom, a hydroxyl group, or an alkoxy group having 1 to 4 carbon atoms.]

(4) The process for producing purified polysaccharide fiber described in (13), in which the cationic portion is an imidazolium ion represented by the following Formula (C1).

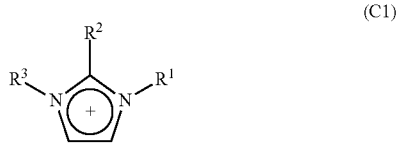

[In the formula, $R^1$ represents an alkyl group having 1 to 4 carbon atoms or an alkenyl group having 2 to 4 carbon atoms; $R^2$ represents a hydrogen atom or a methyl group; and $R^3$ represents an alkyl group having 1 to 8 carbon atoms or an alkenyl group having 2 to 8 carbon atoms.]

(5) The process for producing purified polysaccharide fiber described in any one of (1) to (4), in which and/or of the ionic liquid in the polysaccharide solution and the ionic liquid in the solidification liquid are 1-ethyl-3-methylimidazolium diethylphosphate.

(6) Polysaccharide fiber produced by using the process for producing purified polysaccharide fiber described in any one of (1) to (5).

(7) A tire using a fiber-rubber complex obtained by combining the purified polysaccharide described in (6) with a rubber material.

Advantageous Effects of Invention

According to the process for producing purified polysaccharide fiber of the present invention, it is possible to produce purified polysaccharide fiber which is excellent in recycle efficiency of an ionic liquid and has high toughness and a high degree of elongation at break. Therefore, it is possible to reduce the environmental load.

Furthermore, because the tire of the present invention uses the purified polysaccharide fiber of the present invention, the tire demonstrates excellent tire performance.

BRIEF DESCRIPTION OF DRAWINGS

FIG. 1 is a schematic cross-sectional view showing an example of a process for performing dry-wet spinning on polysaccharide.

DESCRIPTION OF EMBODIMENTS

[Purified Polysaccharide Fiber]

First, the process for producing purified polysaccharide fiber of the present invention will be described.

The process for producing purified polysaccharide fiber of the present invention is a process of bringing a polysaccharide solution, which is obtained by dissolving a polysaccharide raw material in a liquid containing an ionic liquid, into a solidification liquid containing an ionic liquid and performing dry-wet spinning on the polysaccharide. In the process, the concentration of the ionic liquid in the solidification liquid is 0.4% by weight to 70% by weight, and a distance D from a site where the polysaccharide solution is extruded in the form of fiber to a site where the extruded polysaccharide solution comes into contact with the solidification liquid is 50 mm to 120 mm.

Examples of the polysaccharide in the polysaccharide raw material (raw material containing polysaccharide) used in the present invention include cellulose; cellulose derivatives such as ethyl cellulose, carboxymethyl cellulose, hydroxyethyl cellulose, hydroxypropyl cellulose, methyl cellulose, nitrocellulose, and cationized cellulose; gum arabic; carrageenans such as κ-carrageenan, ι-carrageenan, and λ-carrageenan; guar gum; locust bean gum; pectin; tragacanth; corn starch; phosphorylated starch; and microorganism-based polysaccharides such as xanthan gum and dextrin. Among these, cellulose is preferably used.

Examples of the polysaccharide in the polysaccharide raw material also include chitin. Chitin may be natural chitin or recycled chitin. Examples of natural chitin include chitin contained in the covering of insects, the shell of crustacean such as shrimp and crabs, and plants such as mushrooms.

In the present invention, a cellulose raw material is not particularly limited as long as it contains cellulose, and it may be a cellulose raw material derived from plants, animals, or microorganisms. Furthermore, the cellulose raw material may be a recycled cellulose raw material.

Examples of the cellulose raw material derived from plants include cellulose raw materials derived from unprocessed natural plants such as wood, cotton, hemp, and other plants and trees, and processed cellulose raw materials derived from preprocessed plants such as rice straw, bagasse, pulp, wood powder, wood chips, and paper products.

Examples of the natural plants include needle-leaved trees, broad-leaved trees, monocots, dicots, bamboos, and the like.

Examples of the cellulose raw material derived from animals include a cellulose raw material derived from sea squirts.

Examples of the cellulose raw material derived from microorganisms include cellulose raw materials produced by microorganisms that belong to the genus *Aerobacter*, genus *Acetobacter*, genus *Achromobacter*, genus *Agrobacterium*, genus *Alacaligenes*, genus *Azotobacter*, genus *Pseudomonas*, genus *Rhizobium*, genus *Sarcina*, and the like.

Examples of the recycled cellulose raw material include cellulose raw materials obtained by recycling the aforementioned cellulose materials derived from plants, animals, or microorganisms by a known process such as a viscose process.

Among these, as the cellulose raw material in the present invention, pulp that excellently dissolves in an ionic liquid is preferable.

In the present invention, before the polysaccharide raw material containing cellulose and the like is dissolved in the liquid containing an ionic liquid, for the purpose of improving the solubility of the polysaccharide raw material in the ionic liquid, the polysaccharide raw material may be subjected to a pretreatment. Specifically, as the pretreatment, a drying treatment, a physical pulverization treatment such as pulverization or grinding, a chemical modification treatment using an acid or an alkali, and the like can be performed. All of these can be performed by a common method.

In the present invention, the ionic liquid refers to a solvent which is a liquid with a temperature close to room temperature and composed solely of ions. In the ionic liquid, and/or of a cationic portion and an anionic portion are constituted with organic ions. In the present invention, an ionic liquid is selected which is preferable from the viewpoint of the solubility of the polysaccharide, a degree of reduction in the molecular weight of the polysaccharide at the time of dissolving the polysaccharide, and the concentration, melting point, thermal stability, and safety of the ionic liquid.

The ionic liquid is composed of a cationic portion and an anionic portion. The cationic portion of the ionic liquid is not particularly limited, and it is possible to use ions that are generally used in a cationic portion of an ionic liquid.

Among the ions, a nitrogen-containing aromatic ion, an ammonium ion, a phosphonium ion, and the like are exemplified as ions preferable for the cationic portion of the ionic liquid of the present invention.

Specifically, examples of the nitrogen-containing aromatic cation include a pyridinium ion, a pyridazinium ion, a pyrimidinium ion, a pyrazinium ion, an imidazolium ion, a pyrazonium ion, an oxazolium ion, a 1,2,3-triazolium ion, a 1,2,4-triazolium ion, a thiazolium ion, a piperidinium ion, a pyrrolidinium ion, and the like.

Among these, as the nitrogen-containing aromatic cation, an imidazolium ion and a pyrimidinium ion are preferable, an imidazolium ion is more preferable, and an imidazolium ion represented by the following Formula (C3) is particularly preferable.

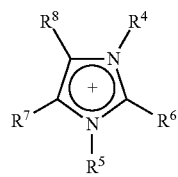

(C3)

[In the formula, each of $R^4$ and $R^5$ independently represents an alkyl group having 1 to 10 carbon atoms or an alkenyl group having 2 to 10 carbon atoms, and each of $R^6$ to $R^8$ independently represents a hydrogen atom or an alkyl group having 1 to 10 carbon atoms.]

In Formula (C3), each of $R^4$ and $R^5$ independently represents an alkyl group having 1 to 10 carbon atoms or an alkenyl group having 2 to 10 carbon atoms.

The alkyl group having 1 to 10 carbon atoms may be linear, branched, or cyclic. The alkyl group is preferably linear or branched, and is more preferably linear.

Specifically, examples of the linear alkyl group include a methyl group, an ethyl group, a propyl group, a butyl group, a pentyl group, a hexyl group, a heptyl group, an octyl group, a nonyl group, a decyl group, and the like.

Specifically, examples of the branched alkyl group include a 1-methylethyl group, a 1,1-dimethylethyl group, a 1-methylpropyl group, a 2-methylpropyl group, a 1,1-dimethylpropyl group, a 2,2-dimethylpropyl group, a 1-methylbutyl group, a 2-methylbutyl group, a 3-methylbutyl group, a 1-methylpentyl group, a 2-methylpentyl group, a 3-methylpentyl group, a 4-methylpentyl group, and the like.

The cyclic alkyl group may be monocyclic or polycyclic. Specifically, examples of the cyclic alkyl group include monocyclic groups such as a cyclopropyl group, a cyclobutyl group, a cyclopentyl group, a cyclohexyl group, a cycloheptyl group, and a cyclooctyl group; and polycyclic groups such as a norbornyl group, an adamantyl group, and an isobornyl group.

The number of carbon atoms of the alkyl group represented by $R^4$ and $R^5$ is preferably 1 to 8. Examples of the alkenyl group having 2 to 10 carbon atoms include an alkenyl group formed as a result of substituting a single bond between carbon-carbon in an alkyl group having 2 to 10 carbon atoms with a double bond. Preferred examples thereof include a vinyl group, an allyl group, and the like. Herein, the position of the double bond is not particularly limited.

The number of carbon atoms of the alkenyl group represented by $R^4$ and $R^5$ is preferably 2 to 8.

Furthermore, $R^4$ and $R^5$ may be the same as or different from each other.

In Formula (C3), each of $R^6$ to $R^8$ independently represents a hydrogen atom or an alkyl group having 1 to 10 carbon atoms.

The alkyl group having 1 to 10 carbon atoms may be linear, branched, or cyclic. The alkyl group is preferably linear or branched, and is more preferably linear. Herein, examples of the linear, branched, and cyclic alkyl groups are the same as the examples of the alkyl group represented by $R^4$ and $R^5$ described above.

The number of carbon atoms of the alkyl group represented by $R^6$ to $R^8$ is preferably 1 to 6, and is more preferably 1 to 3. Furthermore, each of $R^6$ to $R^8$ most preferably represents a hydrogen atom.

In addition, $R^6$ to $R^8$ may be the same as or different from each other.

Preferred examples of the imidazolium ion represented by Formula (C3) specifically include the following Formula (C1).

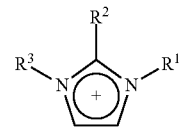

(C1)

[In the formula, $R^1$ represents an alkyl group having 1 to 4 carbon atoms or an alkenyl group having 2 to 4 carbon atoms; $R^2$ represents a hydrogen atom or a methyl group; and $R^3$ represents an alkyl group having 1 to 8 carbon atoms or an alkenyl group having 2 to 8 carbon atoms.]

Preferred examples of the imidazolium ion represented by Formula (C1) specifically include the following Formulae (C1-1) to (C1-3).

(C1-1)

(C1-2)

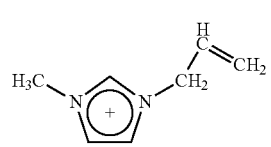

(C1-3)

The further the hydrophilicity of $R^1$ and $R^3$ is increased, the more difficult it is for $R^1$ and $R^3$ to be incorporated into the body, and accordingly, the safety thereof is improved. Therefore, $R^1$ and $R^3$ are preferably short chained. However, when each of $R^1$ and $R^3$ represents a methyl group, as the regularity of the molecule is increased, the melting point thereof tends to be increased, and the viscosity thereof tends to be increased as well. For dissolving the polysaccharide, it is necessary to make the ionic liquid permeate the fiber. Consequently, it is preferable that the ionic liquid used has a low melting point and low viscosity.

Accordingly, $R^1$ is particularly preferably a methyl group, and $R^3$ is particularly preferably an ethyl group.

Furthermore, $R^2$ is preferably a hydrogen atom because it exerts an influence on the solubility of the polysaccharide.

Therefore, among Formulae (C1-1) to (C1-3) described above, 1-ethyl-3-methylimidazolium ion represented by Formula (C1-1) is preferable.

The phosphonium ion is not particularly limited as long as it has "$P^+$". Preferred examples thereof specifically include a phosphonium ion represented by Formula "$R_4P^+$ (each of a plurality of R independently represents a hydrogen atom or a hydrocarbon group having 1 to 30 carbon atoms)".

The hydrocarbon group having 1 to 30 carbon atoms may be an aliphatic hydrocarbon group or an aromatic hydrocarbon group.

The aliphatic hydrocarbon group is preferably a saturated hydrocarbon group (alkyl group). The alkyl group may be linear, branched, or cyclic.

The number of carbon atoms of the linear alkyl group is preferably 1 to 20, and is more preferably 1 to 16. Specifically, examples of the linear alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, and the like.

The number of carbon atoms of the branched alkyl group is 3 to 30, is preferably 3 to 20, and is more preferably 3 to 16. Specifically, examples of the branched alkyl group include a 1-methylethyl group, a 1,1-dimethylethyl group, a 1-methylpropyl group, a 2-methylpropyl group, a 1,1-dimethylpropyl group, a 2,2-dimethylpropyl group, a 1-methylbutyl group, a 2-methylbutyl group, a 3-methylbutyl group, a 1-methylpentyl group, a 2-methylpentyl group, a 3-methylpentyl group, a 4-methylpentyl group, and the like.

The number of carbon atoms of the cyclic alkyl group is 3 to 30, is preferably 3 to 20, and is more preferably 3 to 16. The cyclic alkyl group may be a monocyclic group or a polycyclic group. Specifically, examples of the cyclic alkyl group include monocyclic groups such as a cyclopropyl group, a cyclobutyl group, a cyclopentyl group, a cyclohexyl group, a cycloheptyl group, and a cyclooctyl group and polycyclic groups such as a norbornyl group, an adamantyl group, and an isobornyl group.

The number of carbon atoms of the aromatic hydrocarbon group is preferably 6 to 30. Specifically, examples of the aromatic hydrocarbon group include aryl groups such as a phenyl group, a 1-naphthyl group, a 2-naphthyl group, a biphenyl group, and a tolyl group, a benzyl group, a phenethyl group, and arylalkyl groups such as a naphthylmethyl group and a naphthylethyl group.

Herein, a plurality of R in Formula "$R_4P^+$" may be the same as or different from each other.

Among the above, as the phosphonium ion, a cationic portion represented by the following Formula (C4) is preferable.

(C4)

[In the formula, each of $R^9$ to $R^{12}$ independently represents an alkyl group having 1 to 16 carbon atoms.]

In Formula (C4), each of $R^9$ to $R^{12}$ independently represents an alkyl group having 1 to 16 carbon atoms. The alkyl group having 1 to 16 carbon atoms may be linear, branched, or cyclic. The alkyl group is preferably linear or branched, and is more preferably linear. Herein, examples of the linear, branched, and cyclic alkyl groups are the same as those described above.

$R^9$ to $R^{12}$ may be the same as or different from each other. However, in view of ease of availability, it is preferable that three or more out of $R^9$ to $R^{12}$ are the same as each other.

Among the above, the alkyl group represented by $R^9$ to $R^{12}$ in the present invention is preferably a linear or branched alkyl group having 1 to 14 carbon atoms, is more preferably a linear or branched alkyl group having 1 to 10 carbon atoms, is even more preferably a linear or branched alkyl group having 1 to 8 carbon atoms, and is particularly preferably a linear or branched alkyl group having 1 to 4 carbon atoms.

Preferred examples of the cationic portion represented by Formula (C4) specifically include the following Formula (C5).

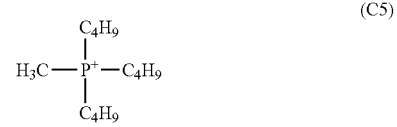

(C5)

In the present invention, the cationic portion is more preferably one or more kinds of ions selected from the group consisting of an imidazolium ion, a pyridinium ion, an ammonium ion, and a phosphonium ion, and is more preferably an imidazolium ion.

In the present invention, examples of the anionic portion include a halogen ion, a carboxylate ion, a phosphinate ion, a phosphonate ion, and a phosphate ion.

Examples of the halogen ion include a chloride ion, a bromide ion, and an iodide ion. Among these, a chloride ion is preferable.

Examples of the carboxylate ion include a formate ion, an acetate ion, a propionate ion, a butyrate ion, a hexanoate ion, a maleate ion, a fumarate ion, an oxalate ion, a lactate ion, a pyruvate ion, and the like. Among these, a formate ion, an acetate ion, and a propionate ion are preferable.

The anionic portion preferably has a compound containing a phosphorus atom, and is more preferably any of a phosphinate ion represented by the following Formula (C2), a phosphonate ion, and a phosphate ion.

(C2)

[In the formula, each of $X^1$ and $X^2$ independently represents a hydrogen atom, a hydroxyl group, or an alkoxy group having 1 to 4 carbon atoms.]

Examples of the phosphate ion include a phosphate ion represented by the following Formula (A1).

[In the formula, each of $R^{13}$ and $R^{14}$ independently represents a hydrogen atom or an alkyl group.]

In Formula (A1), each of $R^{13}$ and $R^{14}$ independently represents a hydrogen atom or an alkyl group. The alkyl group may be linear, branched, or cyclic. However, the alkyl group is preferably a linear or branched alkyl group. The number of carbon atoms of the alkyl group represented by $R^{13}$ and $R^{14}$ is preferably 1 to 10, is more preferably 1 to 6, and is even more preferably 1 to 4. For industrial reasons, the alkyl group is particularly preferably an alkyl group having 1 or 2 carbon atoms.

$R^{13}$ and $R^{14}$ may be the same as or different from each other.

Among the above phosphate ions, a dimethyl phosphate ion and a diethyl phosphate ion are preferable, and a diethyl phosphate ion is more preferable.

Examples of the phosphonate ion include a phosphonate ion represented by the following Formula (A2).

[In the formula, $R^{13}$ has the same definition as described above.]

In Formula (A2), $R^{13}$ has the same definition as that of $R^{13}$ in Formula (A1).

Among the above phosphonate ions, a methyl phosphonate ion is preferable.

The phosphinate ion is represented by the following Formula (A3).

The viscosity and the melting point of the ionic liquid, in which the anionic portion has a compound containing a phosphorus atom, are lower than the viscosity and the melting point of an ionic liquid in which a halogen ion is used as an ionic portion. Therefore, the former ionic liquid is excellent because cellulose is easily spun into threads by using the ionic liquid.

The toughness of the fiber depends not only on the fiber structure but also on the molecular weight of the polysaccharide. Accordingly, at the time of dissolving the polysaccharide in the ionic liquid, by selecting an ionic liquid that reduces the molecular weight of the polysaccharide less, the physical properties of the fiber are further improved.

The ionic liquid, in which the anionic portion has a compound containing a phosphorus atom, does not easily reduce the molecular weight of the polysaccharide and has high thermal resistance (that is, the ionic liquid does not easily undergo thermal decomposition at a high temperature), compared to an ionic liquid in which a carboxylate ion is used as an anionic portion. Therefore, when the polysaccharide is spun into threads by using the former ionic liquid, the spinning temperature can be set to be high. Consequently, it is possible to secure the productivity of the purified polysaccharide fiber at a higher spinning temperature. For example, when a carboxylate ion is used as the anionic potion, if the polysaccharide is spun into threads under a condition of a spinning temperature of equal to or higher than 130° C., the productivity is reduced. However, when the compound containing a phosphorus atom is used as the anionic portion, even if the polysaccharide is spun into threads under a high-temperature condition such as a spinning temperature of 150° C., the productivity can be maintained.

Furthermore, when the ionic liquid, in which the anionic portion has the compound containing a phosphorus atom, is recycled, the yield of recycling is high. Generally, when purified polysaccharide fiber is industrially produced, the ionic liquid, which leaks at the time of making fiber by passing the polysaccharide solution through the solidification liquid, is recycled. The recycling of the ionic liquid is performed by volatilizing liquid components other than the ionic liquid by means of distillation or the like. At this time, the ionic liquid is heated. Therefore, it is important for the ionic liquid to have thermal stability, and the thermal stability of the ionic liquid exerts an influence on the yield of the recycling.

Accordingly, by using the compound containing a phosphorus atom as the anionic portion, it is possible to prevent the increase in the amount of the ionic liquid necessary for continuously producing the purified polysaccharide fiber and to prevent the increase in the amount of the material and energy necessary for producing the ionic liquid.

Examples of the anionic portion other than the above also include a pseudohalogen ion. The pseudohalogen ion has characteristics similar to the characteristics of a halogen ion. Examples of the pseudohalogen ion include a cyanate ion, an oxocyanate ion, a thiocyanate ion, a selenocyanate ion, and the like.

The ionic liquid in the present invention is constituted with the cationic portion and the anionic portion as described above. The combination of the cationic portion and the anionic portion is not particularly limited, and a cationic portion and an anionic portion that can preferably dissolve the cellulose raw material can be appropriately selected.

Preferred examples of the ionic liquid include 1-allyl-3-methylimidazolium chloride (AmimCl), 1-ethyl-3-methylimidazolium acetate (C2mimAc), 1-ethyl-3-methylimidazolium diethylphosphate (C2mimDEP), 1-ethyl-3-methylimidazolium methylphosphonate (C2mimMEP), 1-butyl-3-methylimidazolium acetate (C4mimAc), 1-ethyl-3-methylimidazolium phosphinate (C2mimHPO), and the like.

From the viewpoint of inhibiting the reduction in the molecular weight of the polysaccharide in the fiber, 1-ethyl-3-methylimidazolium acetate (C2mimAc), 1-ethyl-3-methylimidazolium diethylphosphate (C2mimDEP), 1-ethyl-3-methylimidazolium methylphosphonate (C2mimMEP), and 1-ethyl-3-methylimidazolium phosphinate (C2mimHPO) are more preferable, and 1-ethyl-3-methylimidazolium diethylphosphate (C2mimDEP) is particularly preferable.

It is preferable for the ionic liquid to have low viscosity. Specifically, the viscosity at 80° C. of the ionic liquid is preferably 0.5 mPa·s to 1,200 mPa·s, is more preferably 0.7 mPa·s to 800 mPa·s, and is particularly preferably 1.0 mPa·s to 500 mPa·s.

When an ionic liquid having high viscosity is used, it is difficult to dissolve the polysaccharide raw material in the ionic liquid. If the polysaccharide raw material does not easily dissolve, a large amount of polysaccharide raw material remains undissolved. Therefore, the filter is blocked at the time of spinning, and as a result, the productivity is reduced. In addition, when mixing into the fiber, the polysaccharide raw material which remains undissolved becomes a fracture nucleus of the fiber. Consequently, the quality of the fiber is reduced. In contrast, when an ionic liquid having low viscosity is used, at the time of dissolving the polysaccharide raw material in the ionic liquid, the polysaccharide raw material excellently permeates the ionic liquid. Accordingly, the polysaccharide can easily dissolve in the ionic liquid.

In the present invention, the amount of the ionic liquid used is not particularly limited. However, the concentration of the polysaccharide raw material in the polysaccharide solution is preferably 8% by mass to 30% by mass, and is more preferably 10% by mass to 25% by mass. If the concentration of the polysaccharide is too low, a large amount of the ionic liquid leaks in the process of solidification. As a result, fiber having a large number of voids is produced, and toughness is not easily obtained. In contrast, if the concentration of the polysaccharide is too high, the polysaccharide cannot thoroughly dissolve.

In the present invention, the liquid dissolving the polysaccharide raw material contains the aforementioned ionic liquid.

The liquid may or may not contain a liquid component other than the ionic liquid. Specifically, examples of the liquid component other than the ionic liquid include an organic solvent.

The organic solvent is not particularly limited as long as it is other than the ionic liquid, and can be appropriately selected in consideration of the compatibility thereof with the ionic liquid, viscosity, and the like.

The organic solvent is preferably one or more kinds of solvents selected from the group consisting of an amide-based solvent, a sulfoxide-based solvent, a nitrile-based solvent, a cyclic ether-based solvent, and an aromatic amine-based solvent.

Examples of the amide-based solvent include N,N-dimethylformamide, N,N-dimethylacetamide, 1-methyl-2-pyrrolidone, 1-vinyl-2-pyrrolidone, and the like.

Examples of the sulfoxide-based solvent include dimethylsulfoxide, hexamethylenesulfoxide, and the like.

Examples of the nitrile-based solvent include acetonitrile, propionitrile, benzonitrile, and the like.

Examples of the cyclic ether-based solvent include 1,3-dioxolane, tetrahydrofuran, tetrahydropyran, 1,3-dioxane, 1,4-dioxane, 1,3,5-trioxane, and the like.

Examples of the aromatic amine-based solvent include pyridine and the like.

When these organic solvents are used, the mixing ratio between the ionic liquid and the organic solvent is preferably 6:1 to 0.1:1, is more preferably 5:1 to 0.2:1, and is even more preferably 4:1 to 0.5:1, in terms of mass. If the mixing ratio is within the above range, it is possible to obtain a solvent in which the polysaccharide raw material easily swells.

The amount of the organic solvent used is not particularly limited. However, it is preferably 1 part by mass to 30 parts by mass, is preferably 1 part by mass to 25 parts by mass, and is more preferably 3 parts by mass to 20 parts by mass, with respect to 1 part by mass of the polysaccharide raw material. If the amount of the organic solvent used is within the above range, it is possible to obtain a polysaccharide solution having appropriate viscosity.

It is preferable to concurrently use the aforementioned organic solvent with the ionic liquid, because the solubility of the polysaccharide raw material is further improved.

In the present invention, the method for dissolving the polysaccharide raw material in the liquid containing the ionic liquid is not particularly limited. For example, by bringing the liquid containing the ionic liquid into contact with the polysaccharide raw material and heating or stirring the resultant if necessary, a polysaccharide solution can be obtained.

The method for bringing the liquid containing the ionic liquid into contact with the polysaccharide raw material is not particularly limited. For example, the polysaccharide raw material may be added to the liquid containing the ionic liquid, or the liquid containing the ionic liquid may be added to a cellulose raw material.

When heating is performed at the time of dissolution, the heating temperature is preferably 30° C. to 200° C., and is more preferably 70° C. to 180° C. It is preferable to perform heating because the solubility of the polysaccharide raw material is further improved.

The stirring method is not particularly limited. The liquid containing the ionic liquid and the polysaccharide raw material may be mechanically stirred by using a stirrer, a stirring blade, a stirring rod, or the like. Alternatively, the liquid containing the ionic liquid and the polysaccharide raw material may be enclosed in an air-tight container, and the container may be shaken such that the liquid containing the ionic liquid and the polysaccharide raw material are stirred. Furthermore, the liquid containing the ionic liquid and the polysaccharide raw material may be dissolved by using an extruder, a kneader, or the like having a single screw or a plurality of screws. The stirring time is not particularly limited, but it is preferable to perform stirring until the polysaccharide raw material dissolves.

When the liquid containing the ionic liquid contains the organic solvent in addition to the ionic liquid, the organic solvent and the ionic liquid may be mixed together in advance. Alternatively, after the ionic liquid and the polysaccharide raw material are mixed together, the organic solvent may be added thereto and dissolved. Furthermore, after the organic solvent and a cellulose raw material are mixed together, the ionic liquid may be added thereto and dissolved.

Among the above methods, a method of producing a liquid mixture by mixing the organic solvent and the ionic liquid together in advance is preferable. At this time, it is preferable to stir the organic solvent and the ionic liquid while heating them for about 5 minutes to 30 minutes at a temperature of 70° C. to 180° C. such that the organic solvent and the ionic liquid are uniformly mixed together, and to mix them together until the liquid containing the ionic liquid becomes uniform.

By bringing the polysaccharide solution obtained as above into contact with a solidification liquid, which is a liquid other than the polysaccharide solution, so as to solidify the polysaccharide and perform dry-wet spinning, the polysaccharide can be spun into threads.

In the present invention, solidification means the formation (coagulation) of fiber from the polysaccharide solution. The coagulation means a process in which the polysaccharide solution dissolved in the ionic liquid is extruded in the form of fiber from a nozzle of an extruder, and the extruded polysaccharide solution is passed through a bath holding a liquid composed of water, the organic solvent, the ionic liquid, and the like, such that the ionic liquid solvated in the polysaccharide is removed, and the resultant is returned to polysaccharide and solidified in the form of fiber.

The spinning method of the dry-wet spinning is not particularly limited, and a known spinning method can be used to spin the polysaccharide into threads.

Generally, the dry-wet spinning is a method of spinning the polysaccharide into threads by introducing the polysaccharide solution, which has been ejected from a spinning nozzle to gas, into a solidification bath holding the solidification liquid.

The solidification bath means a bath holding the solidification liquid for solidifying the polysaccharide.

When the dry-wet spinning is performed on the polysaccharide, the polysaccharide is solidified from the outside of the fiber. Therefore, when the fiber is observed in the cross-sectional direction, the structure of the inside of the fiber tends to easily vary from the structure outside of the fiber (so-called skin-core structure is easily formed). The smaller the difference between the inside of the fiber and the outside of the fiber, the closer the structure of the fiber becomes to a uniform structure. Accordingly, stress concentration does not easily occur in the fiber, and high toughness can be obtained.

In order to reduce the difference of the structure between the inside of the fiber and the outside of the fiber, the solidification rate of the polysaccharide needs to be controlled. When the solidification rate is too high, the structure of the fiber becomes a skin-core structure, and when the solidification rate is too low, the polysaccharide is incompletely solidified.

The polysaccharide is solidified by coming into contact not with the ionic liquid which is a good solvent in the polysaccharide solution but with the solidification liquid which is a poor solvent. The solidification rate is controlled depending on the degree of the solidification ability of the poor solvent.

In the present invention, because the solidification liquid contains the aforementioned ionic liquid, the solidification rate of the polysaccharide can be controlled. It is preferable that the ionic liquid in the polysaccharide solution and the ionic liquid in the solidification liquid be the same compound.

The values of the upper limit and the lower limit of the concentration of the ionic liquid in a first solidification bath are as below, for example. Herein, the "first solidification bath" is a first bath. Generally, during washing, the polysaccharide passes through a plurality of baths in many cases after the first bath. These baths are used for the purpose of performing washing and carrying out coagulation as well. For example, whether a second bath is called a second solidification bath or called a first washing bath is a tricky problem. Therefore, herein, for convenience, the first bath is defined as a solidification bath, and the second bath is defined as a second solidification bath. The baths from a third bath are defined in the same way.

In the present invention, the concentration of the solidification liquid means a proportion of the ionic liquid in the solvent (water and the ionic liquid) in the solidification bath.

The lower limit of the concentration of the ionic liquid in the solidification liquid is 0.4% by weight. In the present invention, it was clearly revealed that in a case in which the concentration of the ionic liquid in the solidification liquid is less than 0.4% by weight, when the ionic liquid is recovered from the solidification liquid which is separately used at the time of producing the purified polysaccharide fiber, recycle efficiency is significantly reduced.

The upper limit of the concentration of the ionic liquid in the solidification liquid is 70% by weight, and is preferably 20% by weight to 40% by weight.

By adjusting the concentration of the ionic liquid in the solidification liquid in the solidification bath, it is possible to adjust the time (solidification rate) taken until fiber is formed (solidified) from the polysaccharide solution.

If the concentration of the ionic liquid in the solidification liquid is too high, the threads come into contact with a roller or the like before being sufficiently solidified, and this causes breakage of the threads. Furthermore, the cross-sectional shape of the fiber deviates away from being a perfect circle, and the properties of being a perfect circle of the fiber deteriorate. This is because the fiber comes into contact with a roller or the like before being sufficiently solidified in the production process of the fiber, and the shape of the fiber is distorted. If the cross-sectional shape of the fiber deviates away from being a perfect circle, stress concentration occurs in the fiber. Accordingly, the toughness of the fiber is reduced.

As described above, the inventor of the present invention clearly revealed that the concentration of the ionic liquid in the solidification bath exerts an influence on the physical properties (toughness and elongation at break) of the fiber and on the recycle efficiency of the ionic liquid.

In the present invention, a distance D (Air-gap distance) from a site where the polysaccharide solution is extruded in the form of fiber to a site where the extruded polysaccharide solution comes into contact with the solidification liquid is 50 mm to 120 mm, and is preferably 50 mm to 80 mm.

In the present invention, the Air-gap refers to a step of stretching the fiber by exposing the fiber to the outside air such that tension is applied thereto.

In the present invention, purified polysaccharide fiber is preferably obtained as below. A plurality of solidification baths are arranged, such that the concentration of the ionic liquid in the solidification liquid held in the solidification baths is sequentially reduced to the downstream from the upstream in a step of spinning the polysaccharide into threads by using the plurality of solidification baths holding the solidification liquid. The polysaccharide in the polysaccharide solution is spun into threads immediately before the solidification bath on the most upstream side, and then passed through the solidification bath such that a semi-solidified substance of purified polysaccharide fiber is obtained. The semi-solidified substance is then sequentially solidified while moving toward the downstream by using the remaining solidification baths, thereby obtaining purified polysaccharide fiber.

Hereinafter, an embodiment of a process for producing purified polysaccharide fiber of the present invention will be described with reference to FIG. 1.

FIG. 1 is a schematic cross-sectional view showing an example of a process of performing dry-wet spinning on polysaccharide.

First, the polysaccharide solution obtained by dissolving a polysaccharide raw material in the aforementioned ionic liquid is ejected from a spinning nozzle 2 disposed in an extruder 1. The extruder 1 may be a single screw extruder or a double screw extruder. When the polysaccharide solution ejected from the spinning nozzle 2 comes into contact with a first solidification liquid 6 in a first solidification bath 5, which is a solidification bath on the most upstream side, the polysaccharide is spun into threads, and the polysaccharide becomes an intermediate 7 of purified polysaccharide fiber.

After coming into contact with a roller 3 disposed to change the running direction of the intermediate 7, the intermediate 7 comes into contact with a take-up roller 4 and is sent to a second solidification bath 15 which is a solidification bath on the downstream side.

As shown in FIG. 1, the distance D from a site where the polysaccharide solution is extruded in the form of fiber to a site where the extruded polysaccharide solution comes into contact with the first solidification liquid 6 in the first solidification bath 5 is 50 mm to 120 mm.

The concentration of the ionic liquid in a second solidification liquid 16 held in a second solidification bath 15 is set to be lower than the concentration of the ionic liquid in the first solidification liquid 6 held in the first solidification bath 5. By coming into contact with the second solidification liquid 16 in the second solidification bath 15, the intermediate 7, which has been sent from the first solidification bath 5 through the take-up roller 4, is further spun (solidified) into threads and becomes an intermediate 7a. After coming into contact with the roller 3, the intermediate 7a comes into contact with the take-up roller 4 and is sent to a third solidification bath 25 which is a solidification bath on the downstream side.

The concentration of the ionic liquid in a third solidification liquid 26 held in a third solidification bath 25 is set to be lower than the concentration of the ionic liquid in the second solidification liquid 16 held in the second solidification bath 15. By coming into contact with the third solidification liquid 26 in the third solidification bath 25, the intermediate 7a is further spun (solidified) into threads and becomes an intermediate 7b. The intermediate comes into contact with the solidification liquids in the plurality of solidification baths and is gradually spun (solidified) into threads. In this way, a purified polysaccharide fiber is finally produced in which the structure inside the fiber varies little from the structure outside of the fiber.

As described above, by using solidification baths consisting of multistage baths, the solidification rate of the polysaccharide is appropriately controlled, and the physical properties of the fiber becomes excellent. In view of production facilities, the number of the solidification baths is preferably equal to or less than 5, and is more preferably equal to or less than 3.

The preferred concentration of the ionic liquid in the solidification liquid is as described above.

When the concentration of the ionic liquid in the solidification liquid is greater than 70% by weight, unless the retention time during which the polysaccharide or the intermediate stays in the solidification baths is greatly lengthened, fiber cannot be formed.

In the present embodiment, from the viewpoint of maintaining the toughness of the fiber, it is preferable that the retention time during which the polysaccharide or the intermediate stays in all of the solidification baths is set to be equal to or less than 300 seconds.

When solidification baths consisting of multistage baths are used, a relationship between a concentration $X_n$ of the ionic liquid in the nth solidification bath and a concentration $X_{n+1}$ of the ionic liquid in the (n+1)th solidification bath preferably satisfies $X_{n+1} \leq 0.8 X_n$, more preferably satisfies $X_{n+1} \leq 0.6 X_n$, and particularly preferably satisfies $X_{n+1} \leq 0.4 X_n$ (here, $X_n$ is equal to or greater than 20% by weight).

The solidification liquid is preferably composed of an ionic liquid, water, and/or an organic solvent. The organic solvent is preferably a polar solvent. Examples of the polar solvent include tetrahydrofuran, acetone, acetonitrile, N,N-dimethylformamide, dimethylsulfoxide, acetic acid, 1-butanol, 2-propanol, 1-propanol, ethanol, methanol, formic acid, and the like. If an alcohol and a ketone have the same number of carbon atoms, water exhibits the highest solidification rate, followed by the alcohol and the ketone. That is, the smaller the number of carbon atoms, the higher the solidification rate. By appropriately combining water, the alcohol, and the ketone with each other, the solidification rate can be controlled. From the viewpoint of preventing the solidification rate from becoming too low, an alcohol or a ketone having 5 or less carbon atoms is preferable.

The solidification rate of the polysaccharide can also be controlled by the temperature of the solidification bath. When a plurality of solidification baths are used, it is preferable to control the temperature of all of the solidification baths. The temperature of the solidification liquid in all of the solidification baths is preferably 5° C. to 60° C., is more preferably 10° C. to 40° C., and is particularly preferably 20° C. to 40° C. When the temperature of the solidification liquid is equal to or higher than 5° C., the solidification liquid using water will not be partially frozen. If the temperature of the solidification liquid is equal to or less than 60° C., the amount of the solidification liquid evaporated does not become excessive. Therefore, water or an organic solvent does not need to be supplied to the solidification liquid, and the productivity is not reduced too much.

In the present invention, from the viewpoint of effectively utilizing resources, it is preferable to recycle the ionic liquid from the solidification liquid which is separately used at the time of producing the purified polysaccharide fiber. Therefore, it is preferable for the ionic liquid in the solidification liquid to exhibit excellent thermal stability just like the ionic liquid in the polysaccharide solution. As the ionic liquid in the solidification liquid, 1-ethyl-3-methylimidazolium diethylphosphate (C2mimDEP) is particularly preferable. The higher the thermal stability of the ionic liquid in the solidification liquid, the more the thermal decomposition of the ionic liquid is inhibited. Consequently, the amount of the ionic liquid necessary for producing fiber can be reduced, and the productivity can be improved.

The method of recycling is not particularly limited, and examples thereof include a method using an ion-exchange resin, an ion-exchange membrane, a spray drier, or the like. Among these, a spray drier is preferable. If the spray drier is used, the recovered ionic liquid receives a small amount of heat. Therefore, the spray drier is preferably used for an ionic liquid which has low heat resistance and easily undergoes thermal decomposition.

The purified polysaccharide fiber obtained in this way has excellent physical properties (toughness and elongation at break) of fiber. In the present invention, the distance D from a site where the polysaccharide solution is extruded in the form of fiber to a site where the extruded polysaccharide solution comes into contact with the solidification liquid is 50 mm to 120 mm, and the concentration of the ionic liquid in the solidification liquid is 0.4% by weight to 70% by weight. Accordingly, the fiber diameter and the coagulation rate are balanced well, and the uniformity in the cross-sectional direction of the fiber is improved. Therefore, according to the present invention, the recycle efficiency, the physical properties of the fiber, and the yield can be compatible with each other.

If a rubber-fiber complex using the purified polysaccharide fiber with excellent toughness is used in carcass plies, belt plies, or a belt protection layer, a high-performance tire can be obtained. The rubber-fiber complex of the present invention is preferably used in carcass plies among the above, and in this way, it is possible to obtain a tire excellent in pressure resistance and side-cut resistance.

Furthermore, the rubber-fiber complex may be used in at least one of the carcass plies, belt plies, and a belt protection layer. However, the complex can also be used in both the carcass plies or belt plies and a belt protection layer.

As a cord prepared from the polysaccharide fiber, a single-direction twist structure composed of a single bundle of twisted filaments or a double-direction twist structure, in which two bundles of secondarily twisted filaments are combined with each other by primary twisting, is adopted. The fineness per single cord is preferably 1,400 dtex to 6,000 dtex, and is more preferably 1,400 dtex to 4,000 dtex. If a cord with a fineness of less than 1,400 dtex is used, in order to maintain the tire strength, the number of sheets of carcass needs to be increased, and this leads to the increase in the production cost of the tire. If a cord with a fineness of greater than 6,000 dtex is used, the thickness of the carcass layer is increased beyond necessity, and thus the weight of the tire is increased.

A twist coefficient of the cord is preferably 0.30 to 0.80, and is more preferably 0.50 to 0.70.

A twist coefficient tan θ is calculated by the following equation.

$$\tan\theta = T\sqrt{0.125 \times \frac{D}{\rho}} \times 10^{-3}$$

D: total decitex number
P: specific gravity of cord
T: count of twists (number of time the cord is twisted/cm)
[Fiber-Rubber Complex]

The purified polysaccharide fiber is subjected to a dipping treatment by being dipped into a general adhesive such as resolcin-formalin-latex (RFL), and then subjected to a thermal treatment including a drying step and a baking step. The dipped cord prepared as above is combined with a rubber material such as coating rubber, thereby preparing a fiber-rubber complex.

The rubber used in the rubber-fiber complex is obtained from, for example, natural rubber (NR), synthetic rubber having a carbon-carbon double bond, or a rubber composition obtained by blending two or more kinds of the above rubbers.

Examples of the synthetic rubber include polyisoprene rubber (IR), polybutadiene rubber (BR), polychloroprene rubber, or the like which is a homopolymer of a conjugated diene compound such as isoprene, butadiene, or chloroprene; styrene-butadiene copolymer rubber (SBR), vinylpyridine-butadiene-styrene copolymer rubber, acrylonitrile-butadiene copolymer rubber, acrylic acid-butadiene copolymer rubber, methacrylic acid-butadiene copolymer rubber, methyl acrylate-butadiene copolymer rubber, methyl methacrylate-butadiene copolymer rubber, or the like which is a copolymer of the aforementioned conjugated diene compound and a vinyl compound of styrene, acrylonitrile, vinylpyridine, acrylic acid, methacrylic acid, alkyl acrylates, alkyl methacrylates, or the like; a copolymer of olefins such as ethylene, propylene, and isobutylene and a diene compound [for example, isobutylene-isoprene copolymer rubber (IIR)]; a copolymer of olefins and an unconjugated diene (EPDM) [for example, an ethylene-propylene-cyclopentadiene terpolymer, an ethylene-propylene-5-ethylidene-2-norbornene terpolymer, or an ethylene-propylene-1,4-hexadiene terpolymer]; and a ring-opened polymer of norbornene of halides of the aforementioned various rubbers, such as, for example, chlorinated isobutylene-isoprene copolymer rubber (Cl-IIR) or brominated isobutylene-isoprene copolymer rubber (Br-IIR).

The aforementioned synthetic rubbers can be blended with a saturated elastomer such as a polyalkenamer obtained by ring-opening polymerization of cycloolefin [for example, polypentenamer], a rubber obtained by ring-opening polymerization of an oxirane ring [for example, polyepichlorohydrin rubber which can be vulcanized with sulfur], or a polypropylene oxide rubber.

Sulfur, an organic sulfur compound, and other crosslinking agents may be mixed with the rubber composition used in the present invention, preferably in an amount of 0.01 parts by mass to 10 parts by mass and more preferably in an amount of 1 part by mass to 5 parts by mass with respect to 100 parts by mass of the aforementioned rubber component. Furthermore, a vulcanization accelerator may be mixed into the rubber composition, preferably in an amount of 0.01 parts by mass to 10 parts by mass and more preferably in an amount of 0.5 parts to 5 parts with respect to 100 parts by mass of the rubber component. In this case, the type of the vulcanization accelerator is not limited. However, if dibenzothiazyl sulfide (DM), diphenylguanidine (D), or the like is used, the time taken for vulcanization can be shortened.

Furthermore, the rubber composition used in the present invention may be mixed with oil including mineral oil such as paraffinic, naphthenic, aromatic processed oil, a co-oligomer of an ethylene-α-olefin, paraffin wax, or liquid paraffin; or plant oil such as castor oil, cotton seed oil, linseed oil, rape seed oil, soybean oil, palm oil, coconut oil, or peanut oil.

In addition, to the rubber composition used in the present invention, according to the desired purpose, use, or the like, compounding agents generally used in the field of rubbers, such as a filler like carbon black, silica, calcium carbonate, calcium sulfate, clay, or mica; a vulcanization-accelerating aid such as zinc white or stearic acid; and an antioxidant may be added according to a common method.

The tire of the present invention can be prepared by using the rubber-fiber complex through general molding and vulcanization steps.

EXAMPLES

Next, the present invention will be more specifically described by showing examples, but the present invention is not limited to the following examples.

[Preparation of Multifilament]

A polysaccharide solution, which was obtained by dissolving cellulose in 1-ethyl-3-methylimidazolium acetate (C2AmimAc), 1-allyl-3-methylimidazolium chloride (AmimC1), or 1-ethyl-3-methylimidazolium diethylphosphate (C2mimDEP), was heated to a spinning temperature. Thereafter, by using an extruder, the polysaccharide solution was extruded at a predetermined Air-gap distance in a solidification bath which contained the same kind of ionic liquid as the ionic liquid in a spinning solution at a predetermined concentration. The extruded polysaccharide solution was allowed to stay in the solidification bath for a predetermined time and then subjected to a step of washing and drying, thereby obtaining multifilaments (fibers) of Examples 1 to 10 and Comparative examples 1 to 12 shown in Tables 1 to 4.

The details of the production conditions of the multifilaments (fibers) are shown in Tables 1 to 4.

The properties of the multifilaments (fibers) in each of the examples and comparative examples were measured by the following test methods. The results are shown in Tables 1 to 4.

(1) Toughness and Elongation at Break

By using a tensile tester, a tensile test was performed on the fiber, which was twisted four times per 10 cm, under the conditions of 25° C. and 55% RH. The toughness is a value obtained by dividing the rupture strength of the fiber by the fineness thereof, and the elongation at break is the elongation of the fiber at the time of rupturing of the fiber.

(2) Recycle Efficiency

In the multifilaments (fibers) of Examples 1 to 10 and Comparative examples 1 to 12, a weight ratio of the recycled ionic liquid, which was separately used at the time of producing the purified polysaccharide fiber, to the total weight of the ionic liquid used for preparing the multifilaments was taken as recycle efficiency (%).

Because the recycling is performed by evaporating water, the amount of heat necessary is simply approximately proportional to the concentration of water (100% by weight−concentration of ionic liquid (% by weight)). Therefore, when the concentration of water is low, the same amount of ionic liquids can be obtained by using a small amount of heat.

In Tables 1 to 4, the recycle efficiency of less than 0.4% is evaluated to be X, the recycle efficiency of equal to or greater than 0.4% and less than 20% is evaluated to be Δ. Furthermore, the recycle efficiency of equal to or greater than 20% is evaluated to be O.

(3) Yield

A case, in which the fiber could not be prepared in a step of producing the multifilaments (fibers) of Examples 1 to 10 and Comparative examples 1 to 12, was evaluated to be X. Furthermore, a case, in which fiber could be prepared but a relationship between toughness TB (cN/dtex) at 25° C. and elongation at break EB (%) did not satisfy the following Expression (1) regarding the physical properties of the fiber, or a case in which threads are broken with high frequency at the time of spinning was evaluated to be Δ. In addition, a case in which the aforementioned relationship satisfied the following Expression (1) was evaluated to be O. The results are shown in the following Tables 1 to 4.

$$\frac{TB}{EB^{-0.52}} \geq 13 \quad (1)$$

TABLE 1

| | | | Comparative example 1 | Comparative example 2 | Comparative example 3 | Comparative example 4 | Comparative example 5 | Comparative example 6 |
|---|---|---|---|---|---|---|---|---|
| Type of polysaccharide | | | Cellulose | Cellulose | Cellulose | Cellulose | Cellulose | Cellulose |
| Spinning solution | Concentration of polysaccharide | wt % | 10 | 10 | 10 | 10 | 10 | 10 |
| | Type of ionic liquid | | C2mimDEP | C2mimDEP | C2mimDEP | C2mimDEP | C2mimDEP | C2mimDEP |
| First solidification liquid | Type of liquid | | Water | Water | Water | Water | Water | Water |
| | Concentration | wt % | 0.2 | 0.6 | 0.2 | 0.6 | 20 | 20 |
| | Temperature | ° C. | 20 | 20 | 20 | 20 | 20 | 20 |
| Air-gap distance | | mm | 55 | 45 | 115 | 125 | 125 | 45 |
| Yield | | | o | o | Δ | x | x | o |
| Recycle efficiency | | | x | Δ | x | Δ | o | o |
| Physical properties of fiber | Toughness | cN/dtex | 4.0 | 3.5 | 4.5 | — | — | 3.4 |
| | Elongation at break | % | 8.2 | 9.2 | 4.9 | — | — | 10.7 |

TABLE 2

| | | | Comparative example 7 | Comparative example 8 | Comparative example 9 | Comparative example 10 | Comparative example 11 | Comparative example 12 |
|---|---|---|---|---|---|---|---|---|
| Type of polysaccharide | | | Cellulose | Cellulose | Cellulose | Cellulose | Cellulose | Cellulose |
| Spinning solution | Concentration of polysaccharide | wt % | 10 | 10 | 10 | 10 | 10 | 10 |
| | Type of ionic liquid | | C2mimDEP | C2mimDEP | C2mimDEP | C2mimDEP | C2mimDEP | C2mimDEP |
| First solidification liquid | Type of liquid | | Water | Water | Water | Water | Water | Water |
| | Concentration | wt % | 40 | 40 | 65 | 65 | 75 | 75 |
| | Temperature | ° C. | 20 | 20 | 20 | 20 | 20 | 20 |
| Air-gap distance | | mm | 125 | 45 | 45 | 125 | 55 | 115 |
| Yield | | | x | o | o | x | o | Δ |
| Recycle efficiency | | | o | o | o | o | o | o |
| Physical properties of fiber | Toughness | cN/dtex | — | 2.7 | 2.5 | — | 2.7 | 2.6 |
| | Elongation at break | % | — | 9.1 | 8.0 | — | 7.5 | 5.1 |

TABLE 3

|  |  |  | Example 1 | Example 2 | Example 3 | Example 4 | Example 5 |
|---|---|---|---|---|---|---|---|
| Type of polysaccharide |  |  | Cellulose | Cellulose | Cellulose | Cellulose | Cellulose |
| Spinning solution | Concentration of polysaccharide | wt % | 10 | 10 | 10 | 10 | 10 |
|  | Type of ionic liquid |  | C2mimDEP | C2mimDEP | C2mimDEP | C2mimDEP | C2mimDEP |
| First solidification liquid | Type of liquid |  | Water | Water | Water | Water | Water |
|  | Concentration | wt % | 0.6 | 0.6 | 25 | 25 | 35 |
|  | Temperature | °C. | 20 | 20 | 20 | 20 | 20 |
| Air-gap distance |  | mm | 55 | 115 | 55 | 115 | 115 |
| Yield |  |  | ○ | Δ | ○ | Δ | Δ |
| Recycle efficiency |  |  | Δ | Δ | ○ | ○ | ○ |
| Physical properties of fiber | Toughness | cN/dtex | 5.1 | 6.3 | 6.1 | 6.6 | 6.4 |
|  | Elongation at break | % | 11.2 | 7.6 | 10.9 | 10.0 | 10.2 |

TABLE 4

|  |  |  | Example 6 | Example 7 | Example 8 | Example 9 | Example 10 |
|---|---|---|---|---|---|---|---|
| Type of polysaccharide |  |  | Cellulose | Cellulose | Cellulose | Cellulose | Cellulose |
| Spinning solution | Concentration of polysaccharide | wt % | 10 | 10 | 10 | 10 | 10 |
|  | Type of ionic liquid |  | C2mimDEP | C2mimDEP | C2mimDEP | C2mimAc | AmimCl |
| First solidification liquid | Type of liquid |  | Water | Water | Water | Water | Water |
|  | Concentration | wt % | 35 | 65 | 65 | 25 | 25 |
|  | Temperature | °C. | 20 | 20 | 20 | 20 | 20 |
| Air-gap distance |  | mm | 55 | 115 | 55 | 55 | 55 |
| Yield |  |  | ○ | Δ | ○ | ○ | ○ |
| Recycle efficiency |  |  | ○ | ○ | ○ | ○ | ○ |
| Physical properties of fiber | Toughness | cN/dtex | 5.5 | 7.9 | 3.9 | 5.6 | 5.4 |
|  | Elongation at break | % | 11.0 | 5.1 | 12.1 | 10.3 | 10 |

As is evident from Tables 1 and 2, in Comparative example 1, in which the concentration of the ionic liquid in the solidification liquid (first solidification liquid) in the first solidification bath was less than 0.4% by weight, the recycle efficiency and the toughness of the obtained purified polysaccharide fiber were low.

In Comparative example 3, in which the concentration of the ionic liquid in the solidification liquid in the solidification bath was less than 0.4% by weight, the recycle efficiency and the elongation at break of the obtained purified polysaccharide fiber were low.

In Comparative examples 11 and 12, in which the concentration of the ionic liquid in the solidification liquid in the solidification bath was greater than 70% by weight, the toughness of the obtained purified polysaccharide fiber was low.

In Comparative examples 2, 6, 8, and 9, in which the Air-gap (distance D from a site where the polysaccharide solution was extruded in the form of fiber to a site where the extruded polysaccharide solution comes into contact with the solidification liquid) was less than 50 mm, the toughness of the obtained purified polysaccharide fiber was low.

In Comparative examples 4, 5, 7, and 10 in which the Air-gap was greater than 120 mm, the polysaccharide solution could not be spun into threads. Therefore, purified polysaccharide fiber could not be obtained, and the yield was poor.

In contrast, as is evident from Tables 3 and 4, in Examples 1 to 10, the recycle efficiency was high, and purified polysaccharide fiber having high toughness and high elongation at break was obtained with excellent yield.

INDUSTRIAL APPLICABILITY

The present invention provides a process for producing purified polysaccharide fiber, which is excellent in recycle efficiency of an ionic liquid and has high toughness and high elongation at break, purified polysaccharide fiber which is produced by using the production process, and a tire which uses the purified polysaccharide fiber.

REFERENCE SIGNS LIST

1 . . . extruder, 2 . . . spinning nozzle, 3 . . . roller, 4 . . . take-up roller, 5 . . . first solidification bath, 6 . . . first solidification liquid, 7, 7a, 7b . . . intermediate, 15 . . . second solidification bath, 16 . . . second solidification liquid, 25 . . . third solidification bath, 26 . . . third solidification liquid

What is claimed is:

1. A process for producing purified polysaccharide fiber, comprising:
bringing a polysaccharide solution, which is obtained by dissolving a polysaccharide raw material in a liquid containing an ionic liquid, into contact with a first solidification liquid containing an ionic liquid in a first solidification bath; and
performing dry-wet spinning on polysaccharide,
bringing polysaccharide into contact with a second solidification liquid containing an ionic liquid in a second solidification bath,
wherein the concentration of the ionic liquid in the first solidification liquid is 0.4% by weight to 70% by weight and the concentration of the ionic liquid in the second solidification liquid is less than the concentration of the ionic liquid in the first solidification liquid, and a distance D from a site where the polysaccharide solution is extruded in the form of fiber to a site where the extruded polysaccharide solution comes into contact with the first solidification liquid is 50 mm to 120 mm.

2. The process for producing purified polysaccharide fiber according to claim 1,
wherein the concentration of the ionic liquid in the first solidification liquid is 20% by weight to 40% by weight.

3. The process for producing purified polysaccharide fiber according to claim 1,
wherein each of the ionic liquid in the polysaccharide solution and the ionic liquid in the first and second solidification liquids is composed of a cationic portion and an anionic portion, and
the anionic portion contains one or more kinds of ions selected from the group consisting of a phosphinate ion represented by the following Formula (C2), a phosphate ion, and a phosphonate ion,

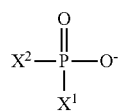

(C2)

in the formula, each of $X^1$ and $X^2$ independently represents a hydrogen atom, a hydroxyl group, or an alkoxy group having 1 to 4 carbon atoms.

4. The process for producing purified polysaccharide fiber according to claim 3,
wherein the cationic portion is an imidazolium ion represented by the following Formula (C1),

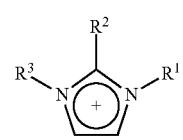

(C1)

in the formula, $R^1$ represents an alkyl group having 1 to 4 carbon atoms or an alkenyl group having 2 to 4 carbon atoms; $R^2$ represents a hydrogen atom or a methyl group; and $R^3$ represents an alkyl group having 1 to 8 carbon atoms or an alkenyl group having 2 to 8 carbon atoms.

5. The process for producing purified polysaccharide fiber according to claim 1,
wherein at least one of the ionic liquid in the polysaccharide solution and the ionic liquid in the first solidification liquid is 1-ethyl-3-methylimidazolium diethylphosphate.

6. The process for producing purified polysaccharide fiber according to claim 1,
wherein the process comprises two or more solidification baths and a relationship between a concentration $X_n$ of the ionic liquid in the $n^{th}$ solidification bath and a concentration $X_{n+1}$ of the ionic liquid in the $(n+1)^{th}$ solidification bath satisfies $X_{n+1} \leq 0.8 X_n$.

7. The process for producing purified polysaccharide fiber according to claim 1,
wherein the process comprises two or more solidification baths and a relationship between a concentration $X_n$ of the ionic liquid in the $n^{th}$ solidification bath and a concentration $X_{n+1}$ of the ionic liquid in the $(n+1)^{th}$ solidification bath satisfies $X_{n+1} \leq 0.6 X_n$.

8. The process for producing purified polysaccharide fiber according to claim 1,
wherein the process comprises two or more solidification baths and a relationship between a concentration $X_n$ of the ionic liquid in the $n^{th}$ solidification bath and a concentration $X_{n+1}$ of the ionic liquid in the $(n+1)^{th}$ solidification bath satisfies $X_{n+1} \leq 0.4 X_n$.

* * * * *